United States Patent Office 3,346,342
Patented Oct. 10, 1967

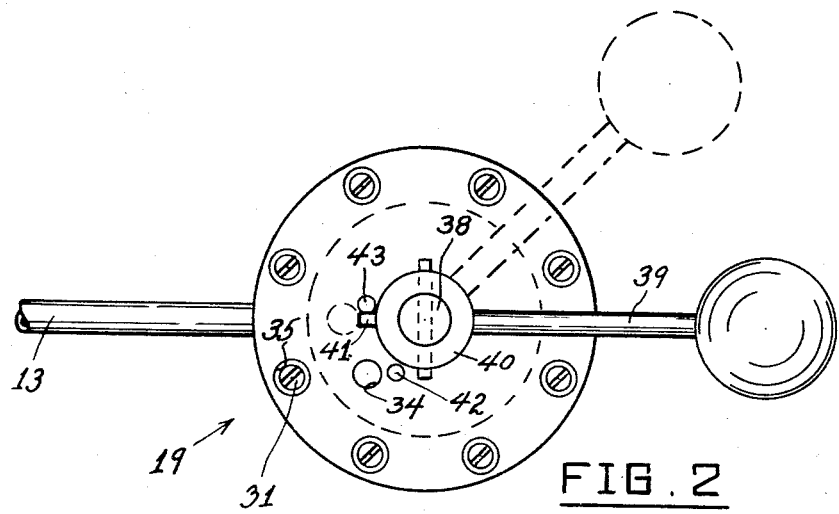
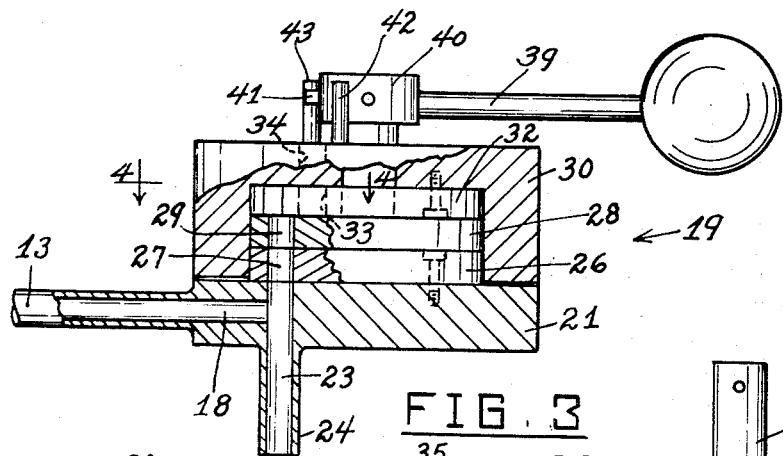
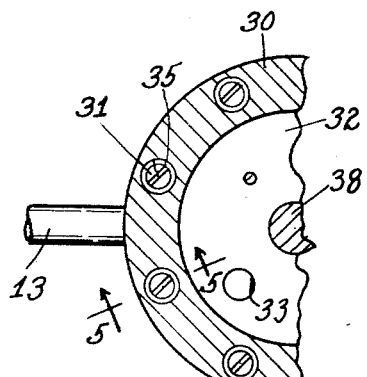
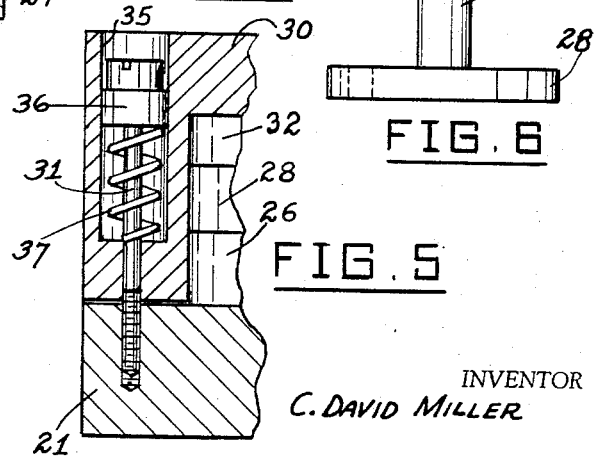

3,346,342
CARBON AND HYDROGEN ANALYZER
C. David Miller, Greenbelt, Md., assignor to American Instrument Company, Inc., Silver Spring, Md.
Filed Oct. 9, 1964, Ser. No. 402,893
13 Claims. (Cl. 23—253)

ABSTRACT OF THE DISCLOSURE

Apparatus to measure carbon and hydrogen content of organic material, consisting of a heated pyrolyzer column containing comminuted cupric oxide above silver wool, maintained at about 1000° C. A sample admission device is provided at the top of the column. Carrier gas (oxygen) is passed through the column with the sample, producing combustion in the column. The combustion products are retained, with the exception of carbon dioxide, which is passed through an outlet tube to an electrical gas detector, thus measuring the carbon of the sample. Water is initially absorbed in a mass of desiccant in the outlet tube, such as calcium sulfate, and is then heat-expelled by a sliding heater on the outlet tube and is driven through a block containing calcium hydride and is there converted, to release hydrogen. The hydrogen is measured by the electrical gas detector.

---

This invention relates to chemical analytical apparatus, and more particularly to an apparatus for determining the carbon and hydrogen content of a sample of organic material by the combustion method.

A main object of the invention is to provide a novel and improved carbon and hydrogen analyzer which is simple in construction, which is easy to operate, and which requires a minimum amount of analysis time.

A further object of the invention is to provide an improved chemical analytical apparatus for examining samples by the combustion method, said apparatus involving relatively inexpensive components, being compact in size, and providing high accuracy.

A still further object of the invention is to provide an improved carbon and hydrogen analyzer for determining the carbon and hydrogen content of organic or other samples by the combustion method, said analyzer being capable of operation by a relatively unskilled person, requiring only a single initial weighing of the sample to be analyzed, and providing an accurate determination of the carbon and hydrogen content of the sample within a very short time after the introduction of the sample.

A still further object of the invention is to provide an improved carbon and hydrogen analyzer which is economical to operate, which is easy to maintain in proper working condition, and which allows on-the-spot analysis of compounds as they are isolated or synthesized.

A still further object of the invention is to provide an improved carbon and hydrogen analyzer for examining samples by the combustion method, said analyzer providing high combustion efficiency, enabling accurate hydrogen and carbon determinations to be made without the addition of a catalyst, and enabling polymeric, organometallic, phosphorous and halogen-containing compounds, and a wide range of additional materials to be readily analyzed with no special precautions.

Further objects and advantages of the invention will become apparent from the following description and claims, and from the accompanying drawings, wherein:

FIGURE 2 is an enlarged top plan view of the sample-admission device employed in the apparatus of FIGURE 1.

FIGURE 3 is a front elevational view, partly in longitudinal vertical cross-section, of the sample-admission device of FIGURE 2.

FIGURE 4 is a horizontal cross-sectional view taken substantially on line 4—4 of FIGURE 3.

FIGURE 5 is an enlarged vertical cross-sectional view taken substantially on line 5—5 of FIGURE 4.

FIGURE 6 is a side elevational view of the rotary sample-transfer member employed in the sample-admission device of FIGURES 2 to 5.

Figure 1:
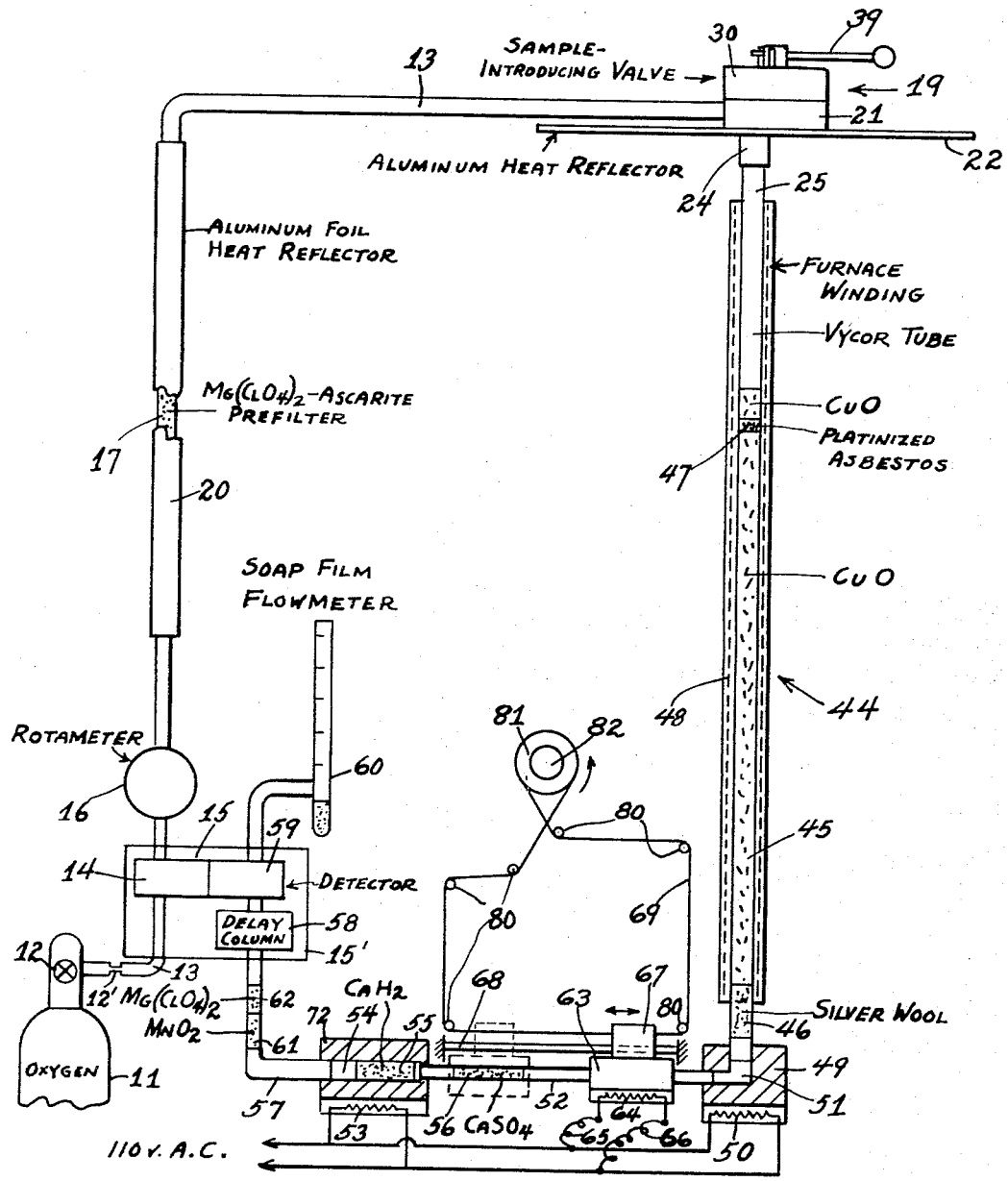
FIGURE 1 is a schematic diagram of an improved carbon and hydrogen analyzer constructed in accordance with the present invention.

Referring to the drawings, FIGURE 1 diagrammatically illustrates a typical carbon and hydrogen analyzer according to the present invention. The analyzer comprises a suitable source of carrier gas, for example, a tank 11 of commercial oxygen provided with a pressure-regulating outlet valve 12 to which is connected a flow-controlling throttling orifice 12′. An outlet conduit 13 is connected from orifice 12′ through the reference cell portion 14 of a conventional electrical gas detector 15, for example, of the thermal conductivity type, a flow meter, such as a rotameter 16, and a pre-filter 17 to the gas inlet passage 18 of a sample-admission valve device 19. The pre-filter 17 may comprise a mass of magnesium perchlorate and Ascarite, and is preferably heat-shielded by a heat-reflective aluminum foil sleeve 20.

The sample-admission device 19 comprises a stationary circular base 21 centrally mounted on a large heat-reflective plate or disc 22. Base 21 is formed with the horizontal inlet passage 18, to which conduit 13 is connected, as above mentioned. Passage 18 communicates with a vertical outlet passage 23 merging with an outlet conduit 24 connected to the top end of a depending vertical pyrolyzer tube 25. Secured centrally on base 21 is a horizontal circular block 26 formed with a vertical bore 27 registering with passage 23. Rotatably disposed on block 26 coaxially therewith is a valve disc 28 having a vertical passage 29 registrable with fixed passage 27, as shown in FIGURE 3. A hollow cylindrical housing 30 coaxially receives disc 28 and block 26 and is resiliently secured to block 21 by a plurality of fastening bolts 31. Secured to the underside of the top wall of housing 30 is a sealing disc 32 formed with a sample-receiving passage 33 which is at the same radial distance from the axis of housing 30 as passage 27 but is spaced angularly therefrom. The top wall of housing 30 is formed with a sample-receiving aperture 34 registering with passage 33. The heads of fastening bolts 31 are received in counterbores 35 provided in the margin of the top of housing 30, and bearing collars 36 are provided on the bolts beneath their heads. Coiled springs 37 surround the bolts, bearing between said collars 36 and the bottoms of the counterbores, urging the housing 30 downwardly so that disc 28 is resiliently held between blocks 32 and 26 with sealing contact. Disc 28 is centrally provided with an upstanding vertical shaft 38 which extends rotatably through block 32 and the top wall of housing 30. An operating arm 39 is secured to the top end of shaft 38. The hub 40 of arm 39 is provided with a radial stop pin 41 engageable with respective upstanding stop pins 42 and 43 provided on the top wall of housing 30. When radial pin 41 engages vertical pin 42, aperture 29 registers with apertures 33 and 34, allowing a sample to be inserted and to be dropped into aperture 29. This is the condition corresponding to the dotted view position of arm 39 in FIGURE 2. By rotating arm 39 clockwise to the full-line position of FIGURE 2, namely, to move pin 41 into abutment with pin 43, aperture 29 is brought into registry with passage 27, allowing the sample to drop into the pyrolyzer tube passage 23.

The pyrolyzer furnace assembly is designated generally at 44 and comprises the pyrolyzer tube 25 of refractory material, such as Vycor, the major portion of which is packed with 20-mesh granular or comminuted cupric oxide 45, arranged above a porous bottom supporting plug 46 of silver wool. A layer of platinized asbestos 47 is provided near the top of the cupric oxide mass 45. The Vycor furnace tube 25 is surrounded by a spiral heating coil 48 of Nichrome wire through which heating current is passed from a suitable source of current, not shown, for example, from the output of a variable transformer, maintaining the temperature of the copper oxide 45 at approximately 1000° C.

The bottom end of tube 25 is secured in a heat sink comprising a stainless steel block 49 provided with a heating winding 50, which maintains the lower end of the tube 25 always at a temperature greater than 100° C.

Tube 25 communicates with a passage 51 in block 49 which communicates with a horizontal relatively small-bore tube 52 leading to another heat sink block 72 provided with a heater winding 53 similar to and energized in parallel with heater winding 50. The tube 52 communicates with a passage 54 in block 72 containing a quantity of calcium hydride 55. The end portion of tube 52 adjacent block 72 contains a quantity of desiccant material 56, such as calcium sulfate.

Passage 54 is connected by a tube 57 through a conventional delay column 58 and the detector cell 59 of gas detection unit 15 to a conventional soap film flowmeter 60, which provides an accurate measurement of flow rate and which discharges to atmosphere. Tube 57 contains a filter comprising a mass of manganese dioxide 61, followed by a mass of magnesium perchlorate 62.

Slidably mounted on and surrounding tube 52 is a heater 63 which is provided with a heating winding 64 connected by flexible wires 65 and 66 in parallel with windings 50 and 53. Heater 63 is relatively small in length as compared with tube 52, but is of sufficient length to substantially cover the desiccant mass 56. However, heater 63 is normally in a position spaced from desiccant mass 56, for example, in the rightward position shown in FIGURE 1. Heater 63 is provided with a supporting lug 67 slidably supported on a stationary rod 68 extending parallel to tube 52. Suitable manually operated means are provided for shifting the position of heater 63 at times so that it covers the desiccant mass 56. Thus, a flexible cable 69 supported on pulleys 80 arranged as illustrated in FIGURE 1 has its ends secured to lug 67 and is wound on a drum 81 provided with an operating knob 82. The lowermost cable guide pulleys 80 of the system are located adjacent the opposite ends of tube 52, whereby rotation of knob 82 moves the heater 63 along the tube. By rotating knob 82 counterclockwise, as viewed in FIGURE 1, heater 63 may be moved from the normal position thereof, shown in full-line view, toward the dotted view position wherein it surrounds the desiccant mass 56.

In operation, a sample (generally a solid or liquid in a thin metal capsule) is introduced into the top end of pyrolyzer tube 45 by means of the sample-introducing device 19 in the manner above described. Tube 45 is at a fixed elevated temperature of approximately 1000° C., and pure oxygen from tank 11 flows through the tube 45 at a constant rate, for example, 40 cc. per minute. Combustion occurs rapidly and uniformly. All the combustion products are retained (by the silver wool 46, the desiccant 56, and the magnesium perchlorate-manganese dioxide filter 61, 62) with the exception of carbon dioxide, the concentration of which is accurately measured by the cell unit 15 as it passes through the detector element 59. Water, which is initially absorbed in the desiccant mass 56, which may comprise, for example, a ¾ inch layer of 30–40 mesh calcium sulfate, is then expelled from the capillary tube 52 by moving the heater 63 into its dotted view position of FIGURE 1 by means of knob 82, whereby the water is driven into the block 72 containing the mass of calcium hydride 55 and is there converted so as to release hydrogen. As above mentioned, the tube 52 is maintained at a temperature above 100° C. by the heated blocks 49 and 72 (by heaters 50 and 53) whereby to prevent condensation of water prior to the conversion thereof to release its hydrogen, and also, the heat from blocks 49 and 72 increases the rate of the conversion reaction and reduces the possibility of preliminary retention of water by calcium hydroxide. The heater 50 in the block 49 aids in the rapid transfer of water in the vapor phase into the desiccant.

Figure 7:
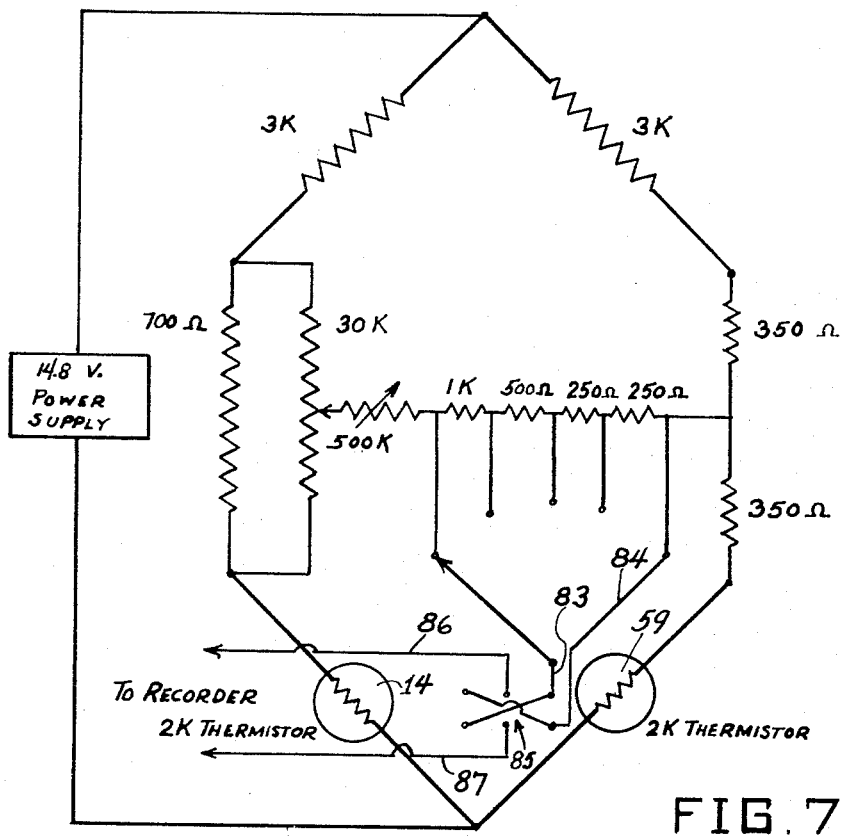
FIGURE 7 is a schematic wiring diagram of a bridge circuit adapted to be employed with the apparatus of FIGURES 1 to 6.
Figure 8:
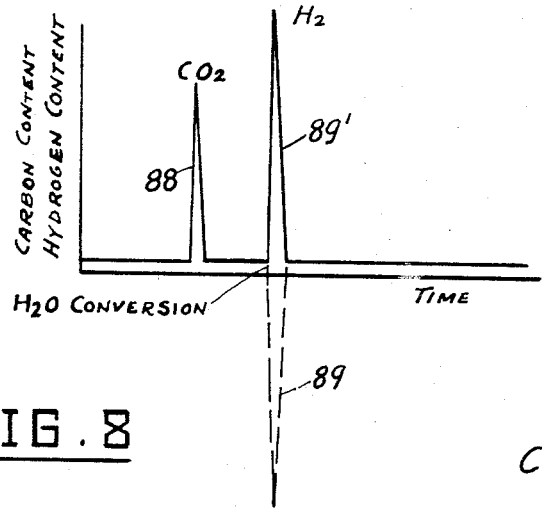
FIGURE 8 illustrates a typical recorder readout curve showing carbon dioxide and hydrogen values derived from a sample analyzed by the apparatus of FIGURES 1 to 7.

The hydrogen released in the above described conversion process is measured by the detecting element 59. As shown in FIGURE 7, the reference element 14 and the detecting element 59 may comprise thermistors connected in two adjacent arms of a conventional bridge circuit having output conductors 83 and 84 connected through a double-pole reversing switch 85 to the input conductors 86 and 87 of a conventional recorder. The carbon dioxide first released, as above described, provides a positive signal peak 88 in the recorder trace, shown in FIGURE 8. The hydrogen subsequently released would ordinarily act on thermistor 59 to provide a negative signal peak 89 on the recorder trace. However, switch 85 is operated immediately after the carbon dioxide peak 88 has been recorded and before the heater 63 is moved to the dotted view position thereof of FIGURE 1. Thus, the connections of wires 83 and 84 to the recorder wires 86 and 87 are reversed, so that the subsequent recorded hydrogen peak, shown at 89' in FIGURE 8, appears to be positive. This enables the complete chart recording span to be utilized, whereas allowing the hydrogen peak to be recorded as a negative peak would require almost twice the width of recording paper, for a given signal calibration, as compared with the width required when the hydrogen peak polarity is reversed in the manner described herein.

Peak heights are linear functions of concentrations, and percentage compositions are calculated by a comparison to a single known standard (usually benzoic acid) using the relationship:

Carbon percentage composition of sample =

$$\frac{\text{Peak height for CO}_2 \text{ of sample/wt. of sample}}{\text{Peak height for CO}_2 \text{ of standard/wt. of standard}} \times$$

Carbon percentage of standard

A similar equation is employed to calculate the hydrogen percentage in the sample.

The rapid uniform introduction of the sample into the hot zone of the pyrolyzer tube 45 is of primary importance since combustion must be virtually spontaneous for all samples, since peak heights rather than peak areas are used for determination of the amount of carbon dioxide formed. The sample-introducing device 19 accomplishes this purpose, and also eliminates purging requirements and minimizes contamination by atmospheric particles.

It is further apparent that the apparatus is very conservative of samples, requiring only 0.50 to 1.0 mg. of sample per analysis. Time requirements are also very small, for example, approximately 2½ minutes per carbon and hydrogen analysis, including weighing. Minute sample masses may be conveniently determined by the use of a commercially available electro-balance, which is relatively insensitive to environmental conditions and allows rapid and accurate weighings in the desired range. The equipment may be operated by a relatively unskilled technician. The system may be also applied to the determination of extremely small traces of water in non-combustible materials.

The system requires relatively precise flow control. This is provided by the use of the throttling orifice 12'. The system also requires relatively precise control of the detector block and delay column temperatures. This may be provided by mounting these elements in a suitable heat-insulating enclosure, shown diagrammatically at 15'.

The function of the delay column 58 is to provide a means for separating pressure disturbances from the sample peak by delaying the carbon dioxide or hydrogen until the system has reestablished equilibrium.

The combustion tube 25 and the calcium hydride conversion chamber 57 are preferably mounted in a manner permitting these elements to be readily changed as required.

The conversion reaction actually involves combination of a proton from the water and a hydride ion from the calcium hydride to produce a molecule of hydrogen according to the reaction:

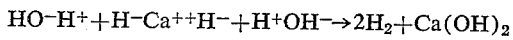

The rotameter provides an approximate indication of the flow rate, and may also be used advantageously for checking leaks by closing off the system at a point subsequent to the sample side of the detector block 15 and noting a condition of no flow.

While a specific embodiment of a carbon and hydrogen analyzer has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In an apparatus for analyzing samples by combustion, a pyrolyzer column, means to elevate said column to combustion temperature, means to admit a sample into one end of said column, whereby to cause combustion of the sample, a receiving conduit connected to the other end of said column, a mass of desiccant in a portion of said receiving conduit to absorb water vapor produced by the combustion of the sample, outlet conduit means connected to said receiving conduit and including an electrical gas detector of the type providing a signal peak responsive to the passage of a gas therethrough, a mass of conversion material in said outlet conduit means reacting with water vapor to release hydrogen, and means to heat said portion after the combustion of a sample to drive the absorbed water vapor out of the desiccant and into contact with said conversion material, whereby to generate hydrogen quantitatively from the water vapor.

2. In an apparatus for analyzing samples by combustion, a pyrolyzer column, a mass of comminuted refractory material in said column, means to elevate said column to combustion temperature, means to admit a sample into one end of said column, whereby to cause combustion of the sample, a receiving conduit connected to the other end of said column, a mass of desiccant in a portion of said receiving conduit to absorb water vapor produced by the combustion of the sample, outlet conduit means connected to said receiving conduit and including an electrical gas detector of the type providing a signal peak responsive to the passage of a gas therethrough, a mass of conversion material in said outlet conduit means reacting with water vapor to release hydrogen, and means to heat said portion after the combustion of a sample to drive the absorbed water vapor out of the desiccant and into contact with said conversion material, whereby to generate hydrogen quantitatively from the water vapor.

3. In an apparatus for analyzing samples by combustion, a pyrolyzer column, a mass of comminuted refractory material in said column, a source of carrier gas connected to said column, means to elevate said column to combustion temperature, means to admit a sample into one end of said column, whereby to cause combustion of the sample, a receiving conduit connected to the other end of said column, a mass of desiccant in a portion of said receiving conduit to absorb water vapor produced by the combustion of the sample, outlet conduit means connected to said receiving conduit and including an electrical gas detector of the type providing a signal peak responsive to the passage of a gas therethrough, a mass of conversion material in said outlet conduit means reacting with water vapor to release hydrogen, and means to heat said portion after the combustion of a sample to drive the absorbed water vapor out of the desiccant and into contact with said conversion material, whereby to generate hydrogen quantitatively from the water vapor.

4. In an apparatus for analyzing samples by combustion, a pyrolyzer column, a mass of comminuted copper oxide in said column, a source of oxygen connected to said column, means to elevate said column to combustion temperature, means to admit a sample into one end of said column, whereby to cause combustion of the sample, a receiving conduit connected to the other end of said column, a mass of desiccant in a portion of said receiving conduit to absorb water vapor produced by the combustion of the sample, outlet conduit means connected to said receiving conduit and including an electrical gas detector of the type providing a signal peak responsive to the passage of a gas therethrough, a mass of conversion material in said outlet conduit means reacting with water vapor to release hydrogen, and means to heat said portion after the combustion of a sample to drive the absorbed water vapor out of the desiccant and into contact with said conversion material, whereby to generate hydrogen quantitatively from the water vapor.

5. The structure of claim 4, and wherein said conversion material comprises calcium hydride.

6. In an apparatus for analyzing samples by combustion, a pyrolyzer column containing comminuted non-combustible material, means to elevate said material to a relatively high temperature, a source of carrier gas connected to one end of said column, means to admit a sample into said one end, whereby to cause combustion of the sample, a receiving tube connected to the other end of said column, a mass of desiccant in a portion of said receiving tube to absorb water vapor produced by the combustion of the sample, outlet conduit means connected to said receiving tube and including an electrical gas detector of the type providing a signal peak responsive to the passage of a gas therethrough, a mass of conversion material in said outlet conduit means reacting with water vapor to release hydrogen, and heating means movably mounted adjacent said receiving tube, said heating means being normally spaced from said portion to allow water vapor to be absorbed by said mass of desiccant following the combustion of a sample, and being subsequently movable into heat-transfer relation to the desiccant to drive the water vapor into contact with said conversion material, whereby to generate hydrogen quantitatively from the water vapor.

7. In an apparatus for analyzing samples by combustion, an upright pyrolyzer column containing comminuted non-combustible material, means to maintain said comminuted material at a relatively high temperature, a source of carrier gas connected to the top end of said column, means to admit a sample into said top end, whereby to cause combustion of the sample, a receiving tube connected to the bottom end of the column, a mass of desiccant in a portion of said receiving tube to absorb water vapor produced by the combustion of the sample, outlet conduit means connected to said receiving tube and including an electrical gas detector of the type providing a signal peak responsive to the passage of a gas therethrough, a mass of conversion material in said outlet conduit means reacting with water vapor to release hydrogen, a heater adjacent said receiving tube, and support means for said heater allowing the heater to be normally spaced from said portion but to be moved into heat-transfer relation to said portion following the combustion of a sample, whereby to drive the water vapor out of the desiccant into contact with said conversion material.

8. The structure of claim 7, and wherein said support means comprises a guide rod extending parallel to said receiving tube and wherein said heater is slidably mounted on said guide rod.

9. The structure of claim 7, and wherein said non-combustible material comprises approximately 20-mesh cupric oxide.

10. The structure of claim 9, and wherein said conversion material comprises calcium hydride.

11. The structure of claim 7, and auxiliary heating means adjacent the bottom end of the column and means to energize said auxiliary heating means sufficiently to maintain the end of the receiving tube connected thereto at a temperature above 100° C.

12. The structure of claim 7, and further heating means adjacent the conversion material and means to energize said further heating means sufficiently to maintain the conversion material at a temperature above 100° C., whereby to prevent condensation of water subsequent to its vaporization and prior to its conversion and to facilitate the conversion reaction.

13. In an apparatus for analyzing samples by combustion, a pyrolyzer column, means to elevate said column to combustion temperature, means to admit a sample into one end of said column, whereby to cause combustion of the sample, a receiving conduit connected to the other end of said column, a mass of desiccant in a portion of said receiving conduit to absorb water vapor produced by the combustion of the sample, outlet conduit means connected to said receiving conduit and including an electrical gas detector of the type providing a signal peak responsive to the passage of a gas therethrough, said gas detector having a pair of output conductors, a pair of indicator input conductors, means including a reversing switch connecting said output conductors to said indicator input conductors, enabling a signal from the gas detector to be at times applied to the indicator input conductors with reversed polarity, a mass of conversion material in said outlet conduit means reacting with water vapor to release hydrogen, and means to heat said portion after the combustion of a sample to drive the absorbed water vapor out of the desiccant and into contact with said conversion material, whereby to generate hydrogen quantitatively from the water vapor.

References Cited
UNITED STATES PATENTS

| 3,050,372 | 4/1962 | Scott | 23—230 |
| 3,207,585 | 9/1965 | Glass et al. | 23—253 |
| 3,252,759 | 5/1966 | Simon | 23—253 |

JOSEPH SCOVRONEK, *Primary Examiner.*

MORRIS O. WOLK, *Examiner.*

L. MEI, *Assistant Examiner.*